(12) United States Patent
Hura et al.

(10) Patent No.: US 10,344,602 B2
(45) Date of Patent: Jul. 9, 2019

(54) GAS TURBINE ENGINE TRANSITION DUCT AND TURBINE CENTER FRAME

(71) Applicant: General Electric Company, Schenectady, NY (US)

(72) Inventors: Harjit Hura, Cincinnati, OH (US); Paul Hadley Vitt, Liberty Township, OH (US); Brian David Keith, Cincinnati, OH (US); Jonathan Ong, Munich (DE)

(73) Assignee: General Electric Company, Schenectady, NY (US)

( * ) Notice: Subject to any disclaimer, the term of this patent is extended or adjusted under 35 U.S.C. 154(b) by 435 days.

(21) Appl. No.: 15/131,292

(22) Filed: Apr. 18, 2016

(65) Prior Publication Data

US 2017/0298747 A1    Oct. 19, 2017

(51) Int. Cl.
*F01D 9/02* (2006.01)
*F02C 3/04* (2006.01)
(Continued)

(52) U.S. Cl.
CPC ............. *F01D 9/023* (2013.01); *F01D 5/143* (2013.01); *F01D 5/145* (2013.01); *F01D 9/02* (2013.01);
(Continued)

(58) Field of Classification Search
CPC . F01D 9/023; F01D 9/02; F01D 9/065; F01D 5/143; F01D 5/145; F01D 5/141;
(Continued)

(56) References Cited

U.S. PATENT DOCUMENTS 5,975,537 A   11/1999  Turnquist et al.
6,036,438 A *  3/2000  Imai ...................... F01D 5/142
                                                  415/192
(Continued)

FOREIGN PATENT DOCUMENTS

EP       2 159 398 A2    3/2010
EP       2 518 272 A2    10/2012
WO       2014/046832 A1   3/2014

OTHER PUBLICATIONS

Extended European Search Report and Opinion issued in connection with corresponding EP Application No. 17164948.6 dated Aug. 17, 2017.
(Continued)

*Primary Examiner* — Steven M Sutherland
(74) *Attorney, Agent, or Firm* — General Electric Company; William Scott Andes

(57) ABSTRACT

A transition duct includes fairings with transition duct flow passage and hollow fairing airfoils extending between outer and inner walls of fairings and means for smoothing pressure gradients along inner wall. One means is a contracting duct flow area of flow passage from leading edge of fairing airfoil to about 30% of fairing chord. Leading edges of fairing airfoil intersect outer walls aft of regions of high curvature of outer walls. Leading edges may curve axially aftwardly and radially into fairing airfoils and transition duct flow passage between radially outer and inner walls from radially outer and inner intersection points. Transition duct downstream second area/upstream first area may be greater than about 1.35. Turbine center frame may include outer ring coupled to central hub with struts extending through hollow airfoils.

25 Claims, 9 Drawing Sheets

(51) Int. Cl.
- *F02C 7/20* (2006.01)
- *F01D 5/14* (2006.01)
- *F01D 9/06* (2006.01)
- *F04D 29/54* (2006.01)
- *F04D 29/58* (2006.01)

(52) U.S. Cl.
CPC .............. *F01D 9/065* (2013.01); *F02C 3/04* (2013.01); *F02C 7/20* (2013.01); *F04D 29/545* (2013.01); *F04D 29/584* (2013.01); *F05D 2220/32* (2013.01); *Y02T 50/671* (2013.01); *Y02T 50/673* (2013.01)

(58) Field of Classification Search
CPC .......... F01D 9/041; F02C 7/20; F04D 29/545; F04D 29/54; F05D 2240/12; F05D 415/191
See application file for complete search history.

(56) References Cited

U.S. PATENT DOCUMENTS

| | | | |
|---|---|---|---|
| 6,195,983 B1 | 3/2001 | Wadia et al. | |
| 6,676,369 B2 | 1/2004 | Brauer et al. | |
| 6,708,482 B2 | 3/2004 | Seda | |
| 6,758,477 B2 | 7/2004 | Brauer et al. | |
| 6,883,303 B1 | 4/2005 | Seda | |
| 8,272,643 B2 | 9/2012 | Garrison et al. | |
| 8,387,991 B2 | 3/2013 | Durling | |
| 9,222,437 B2 | 12/2015 | Mechnaim et al. | |
| 2003/0184022 A1 | 10/2003 | Brauer et al. | |
| 2003/0185669 A1 | 10/2003 | Brauer et al. | |
| 2007/0253809 A1 | 11/2007 | Glynn et al. | |
| 2010/0040462 A1* | 2/2010 | Praisner | F01D 9/023 415/208.1 |
| 2011/0225979 A1 | 9/2011 | Hoeger et al. | |
| 2012/0251290 A1 | 10/2012 | Turnquist et al. | |
| 2014/0086739 A1* | 3/2014 | Machnaim | B23P 11/00 415/220 |
| 2014/0255159 A1* | 9/2014 | Paradis | F01D 9/02 415/115 |
| 2015/0300253 A1 | 10/2015 | Lord | |

OTHER PUBLICATIONS

First Office Action and Search issued in connection with corresponding CN Application No. 201710253128.2 dated Oct. 18, 2018 (English Translation not available).

* cited by examiner

GAS TURBINE ENGINE TRANSITION DUCT AND TURBINE CENTER FRAME

BACKGROUND OF THE INVENTION

Technical Field

The present invention relates to gas turbine engine turbine sections and, more specifically, to gas turbine engine high and low pressure turbines and a turbine center frame and transition duct therebetween.

Background Information

At least some known gas turbine engines include in downstream serial flow relationship a forward fan, a core engine, and a low-pressure turbine (LPT). The core engine includes at least one compressor, a combustor, and a high-pressure turbine (HPT). The compressor and HPT are coupled through a shaft to define a high-pressure rotor assembly. Air entering the core engine is compressed, mixed with fuel, and ignited to form a high energy gas stream. The high energy gas stream is directed through the HPT to rotatably drive the HPT such that the shaft rotatably drive the compressor. The high energy gas stream is then channeled downstream from the HPT to the LPT via a transition duct.

Generally, the HPT has a smaller radius than the LPT and, thus, the transition duct has an "S" shaped cross-section to facilitate flow therebetween. Generally, it is desirable to transition from the smaller-radius high-pressure turbine to the larger-radius low-pressure turbine within as short an axial distance as possible. Such a quick transition with a shorter transition duct facilitates reducing the weight of the overall turbine assembly and facilitates increasing the performance of the engine. However, using a shorter transition duct with aggressive curvature may lead to flow separation at the boundary layers of transition duct inner and outer walls.

The engine may include a turbine center frame (TCF) between the HPT and the LPT. Radially extending TCF struts are surrounded and shrouded by and pass through fairings of the transition duct. The fairings extend radially between the transition duct inner and outer walls.

U.S. Pat. No. 9,222,437 by Joseph Machnaim, et al. issued Dec. 29, 2015 and entitled "TRANSITION DUCT FOR USE IN A TURBINE ENGINE AND METHOD OF ASSEMBLY" discloses a transition duct fluidly connecting and coupling a high-pressure turbine (HPT) to a low-pressure turbine (LPT) in an aircraft gas turbine engine and is incorporated herein by reference. The patent notes that it is generally desirable to quickly transition from the smaller-radius HPT to the larger-radius LPT with a transition duct to channel fluid flowing therethrough. Transition to the larger radius facilitates improving LPT performance and efficiency. However, using a transition duct that has a shorter axial length with aggressive outer wall slope may lead to unwanted boundary layer flow separation of the fluid flowing therethrough. Furthermore, known transition ducts include fairings to accommodate struts of the center frame extending therethrough that are used to support a turbine center frame.

These known struts and fairings disrupt the flow of fluid flowing through the transition duct. Accordingly, boundary layer flow separation may also occur on the fairing or at the interface between the fairing and the outer wall, i.e. at the location where both the boundary layers interact. The transition duct described and disclosed in the patent document is designed to facilitate reducing flow separation of fluid channeled from the HPT to the LPT. More specifically, the transition duct includes an aggressive outer wall slope from the duct inlet to a predetermined axial location in the transition duct, and reduced outer wall slope from the predetermined axial location to the duct discharge. In the exemplary embodiment disclosed therein, the predetermined axial location is the thickest portion ($T_{max}$ location) of the aerodynamic strut fairing. Accordingly, the transition duct described therein facilitates improving LPT performance and efficiency by controlling the boundary layer interaction between the outer wall of the transition duct and the strut fairing.

The fairings and their aerodynamic interaction with the transition duct inner and outer walls may cause DP/P loss across the transition duct and the turbine center frame. It is therefore very important to minimize this DP/P loss and to minimize flow separation at the boundary layers of transition duct inner and outer walls.

SUMMARY OF THE INVENTION

A gas turbine engine transition duct includes a plurality of fairings including hollow fairing airfoils extending radially between radially outer and inner walls of the fairings, a transition duct flow passage radially disposed at least in part between the radially outer and inner walls, and a means for smoothing pressure gradients along the inner wall. The means for smoothing pressure gradients may include a contracting duct flow area of a fairing airfoil passage extending through the transition duct between leading and trailing edges of the fairing airfoil and the fairing airfoil passage from the leading edge of the fairing airfoil to about 30% of the fairing chord.

Leading edges of the fairing airfoils may be attached to or intersecting the radially outer walls aft or downstream of regions of high curvature of the radially outer walls. The leading edges may aftwardly sweep or aftwardly lean downstream.

The radially outer and inner intersection points of the leading edges along the radially outer and inner walls respectively may include the outer intersection points located aft and downstream of the inner intersection points.

The leading edges may curve axially aftwardly and radially into the fairing airfoils and the transition duct flow passage between the radially outer and inner walls from radially outer and inner intersection points of the leading edges along the radially outer and inner walls respectively.

The transition duct may be circumscribed about a centerline axis and include first and second radial distances extending radially from the centerline axis to the radially outer and inner walls at upstream and downstream ends of the duct respectfully wherein the second radial distance is greater than the first radial distance. The transition duct includes a height, a length, a first area at the upstream end, and a second area at the downstream end and an area ratio defined as (the second area/the first area) is greater than about 1.35.

A gas turbine engine transition duct and turbine center frame assembly includes a turbine center frame including an outer ring positioned about a central hub coupled together with struts extending radially therebetween, a transition duct including a plurality of fairings including hollow fairing airfoils extending radially between radially outer and inner walls of the fairings, and the struts passing radially through the hollow fairing airfoils.

A gas turbine engine circumscribed about a centerline axis includes, in downstream serial relationship, a fan, a low pressure booster or compressor, a high pressure compressor, a combustor, a high pressure turbine, and a low pressure turbine. A turbine center frame in part supporting and coupling together the high and low pressure turbines includes an outer ring positioned about a central hub coupled together with struts extending radially therebetween and a transition duct fluidly connecting the high and low pressure turbines and including a plurality of fairings including hollow fairing airfoils extending radially between radially outer and inner walls of the fairings and the struts passing radially through the hollow fairing airfoils.

BRIEF DESCRIPTION OF THE DRAWINGS

The invention, in accordance with preferred and exemplary embodiments, is more particularly described in the following detailed description taken in conjunction with the accompanying drawings in which.

DESCRIPTION

Figure 1:
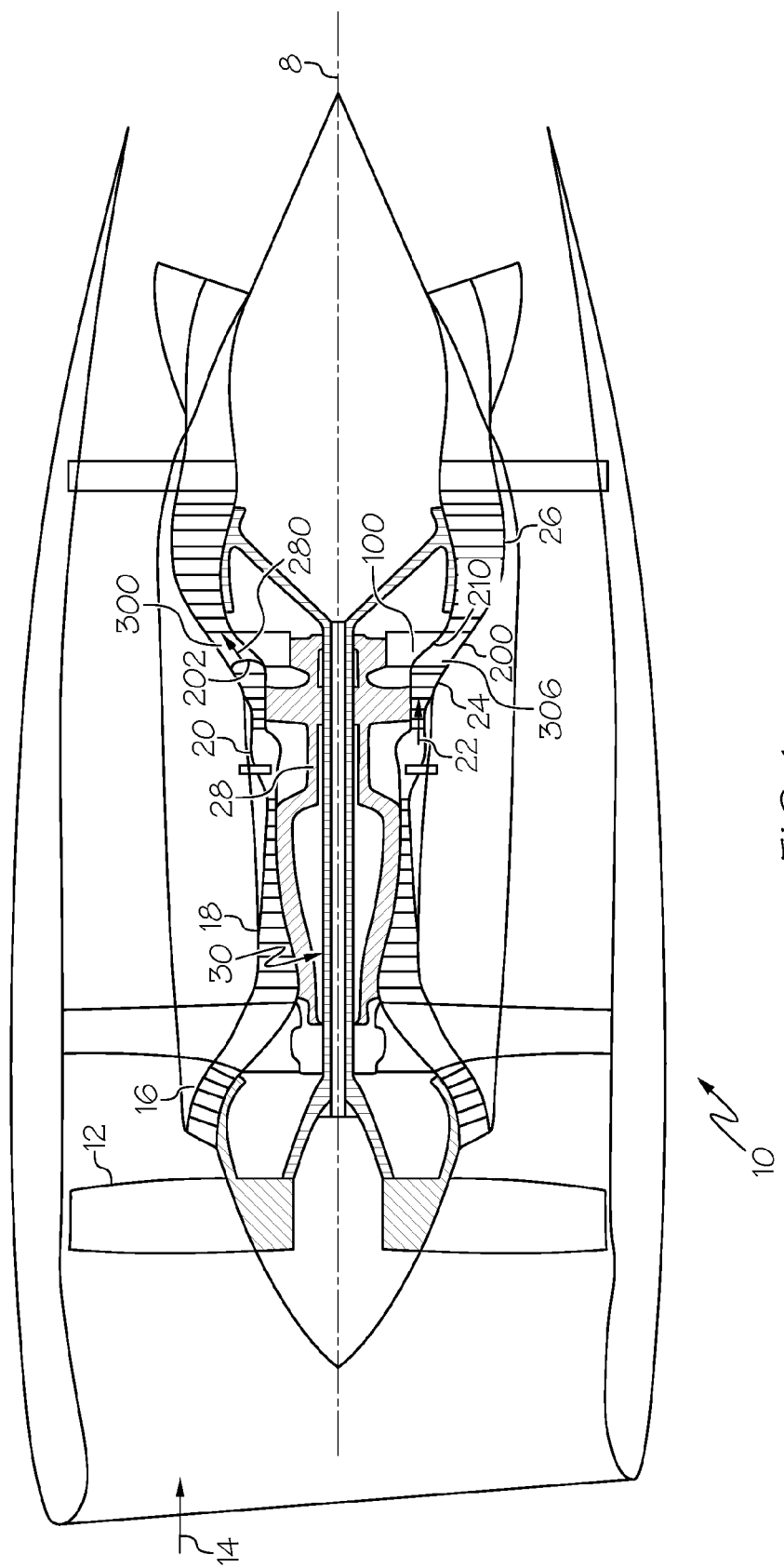
FIG. 1 is a cross-sectional view schematical illustration of an exemplary aircraft turbofan gas turbine engine including a low pressure loss transition duct and a turbine center frame between high and low pressure turbines.

Illustrated schematically in FIG. 1 is an exemplary gas turbine engine 10 circumscribed about a centerline axis 8 of the engine 10 and including, in downstream serial relationship, a fan 12 which receives ambient air 14, a low pressure booster or compressor 16, a high pressure compressor (HPC) 18, a combustor 20 which mixes fuel with the air 14 pressurized by the HPC 18 for generating combustion gases 22 which flow downstream through a high pressure turbine (HPT) 24, and a low pressure turbine (LPT) 26 from which the combustion gases 22 are discharged from the engine 10. A first or high pressure shaft 28 joins the HPT 24 to the HPC 18, and a second or low pressure shaft 30 joins the LPT 26 to both the fan 12 and the low pressure compressor 16. A substantially annular transition duct 300 fluidly connects the high pressure turbine 24 and the low pressure turbine 26. The transition duct 300 is diffusive and diffuses fluid flow 280 between the high pressure turbine 24 and the low pressure turbine 26.

Figure 2:
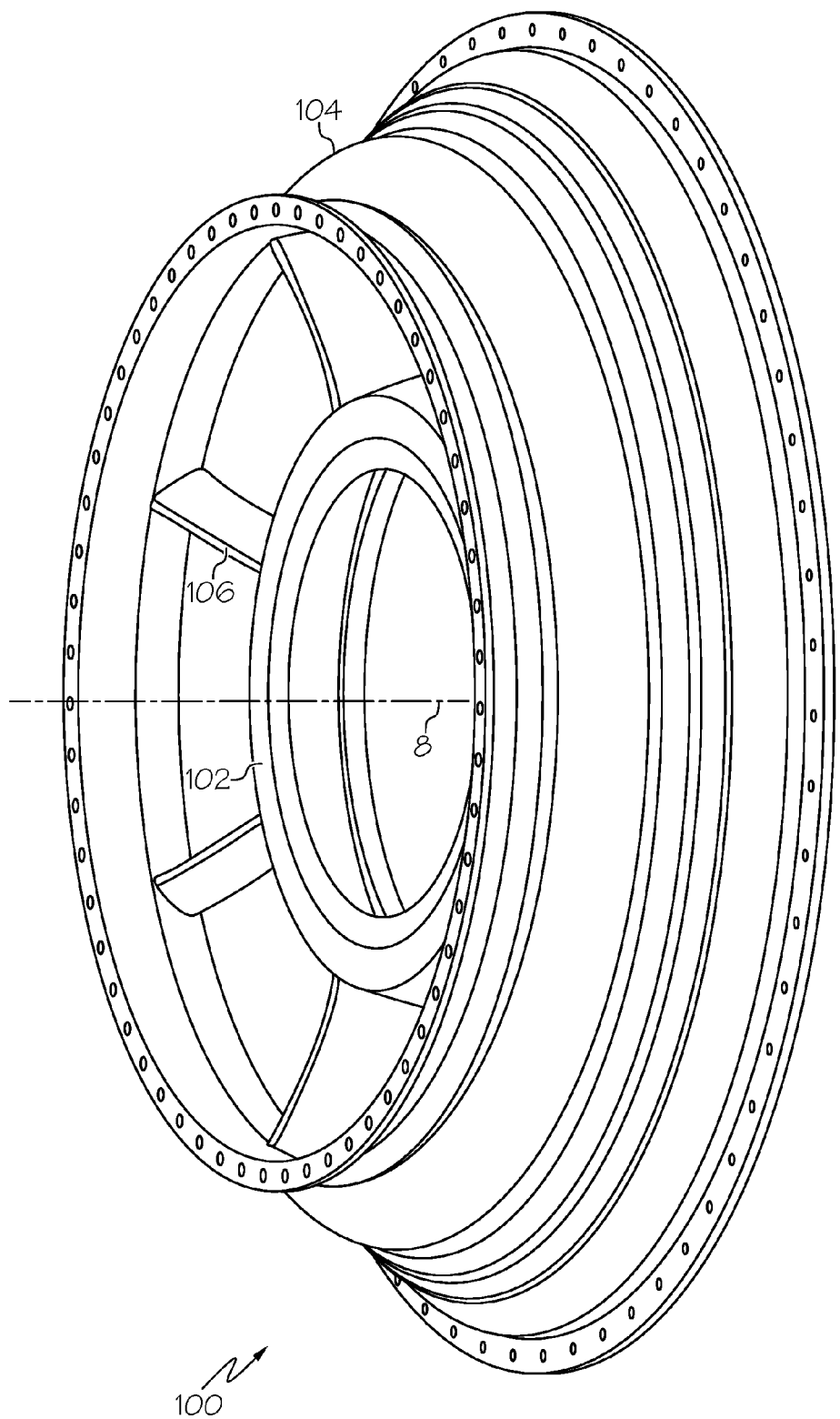
FIG. 2 is a perspective view illustration of an exemplary turbine center frame that may be used in the turbine engine illustrated in FIG. 1.
Figure 3:
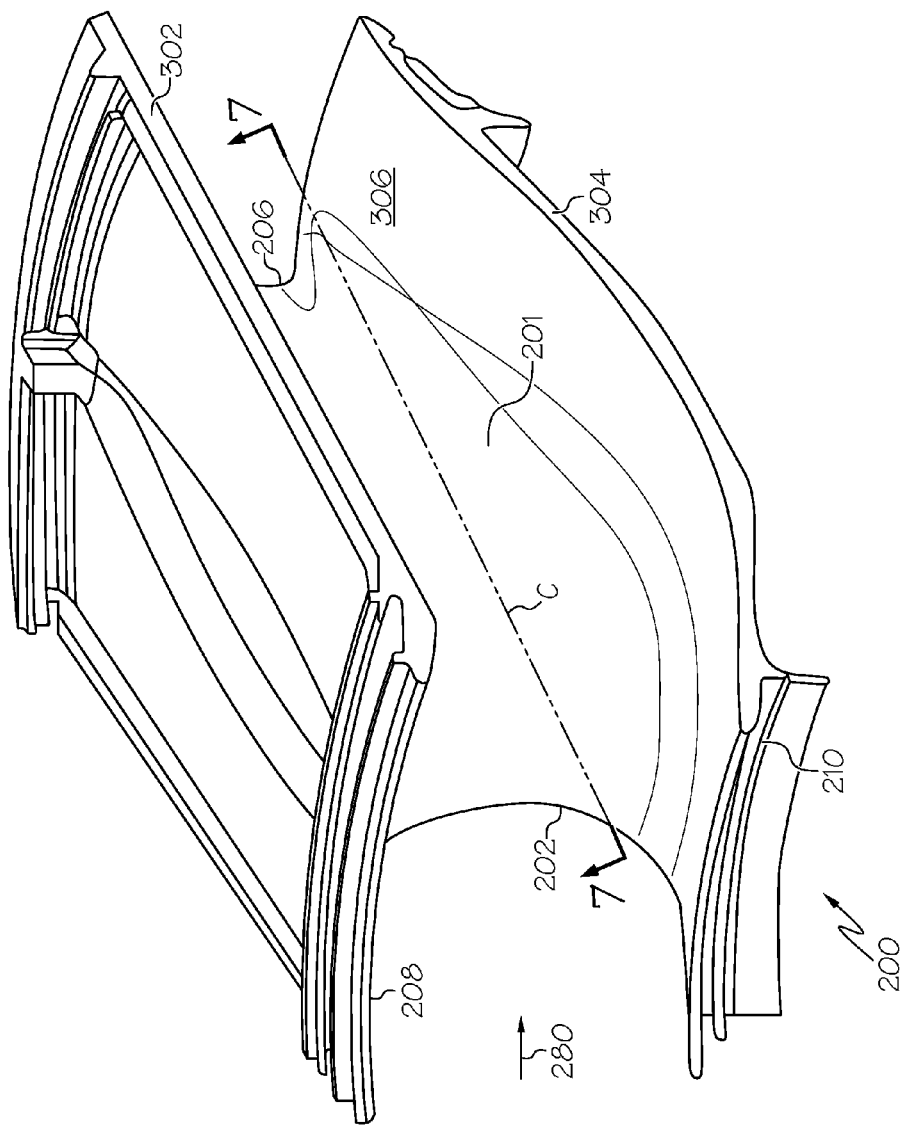
FIG. 3 is a perspective view illustration of an exemplary fairing with an aft swept leading edge that may be used with the turbine center frame illustrated in FIG. 2.
Figure 4:
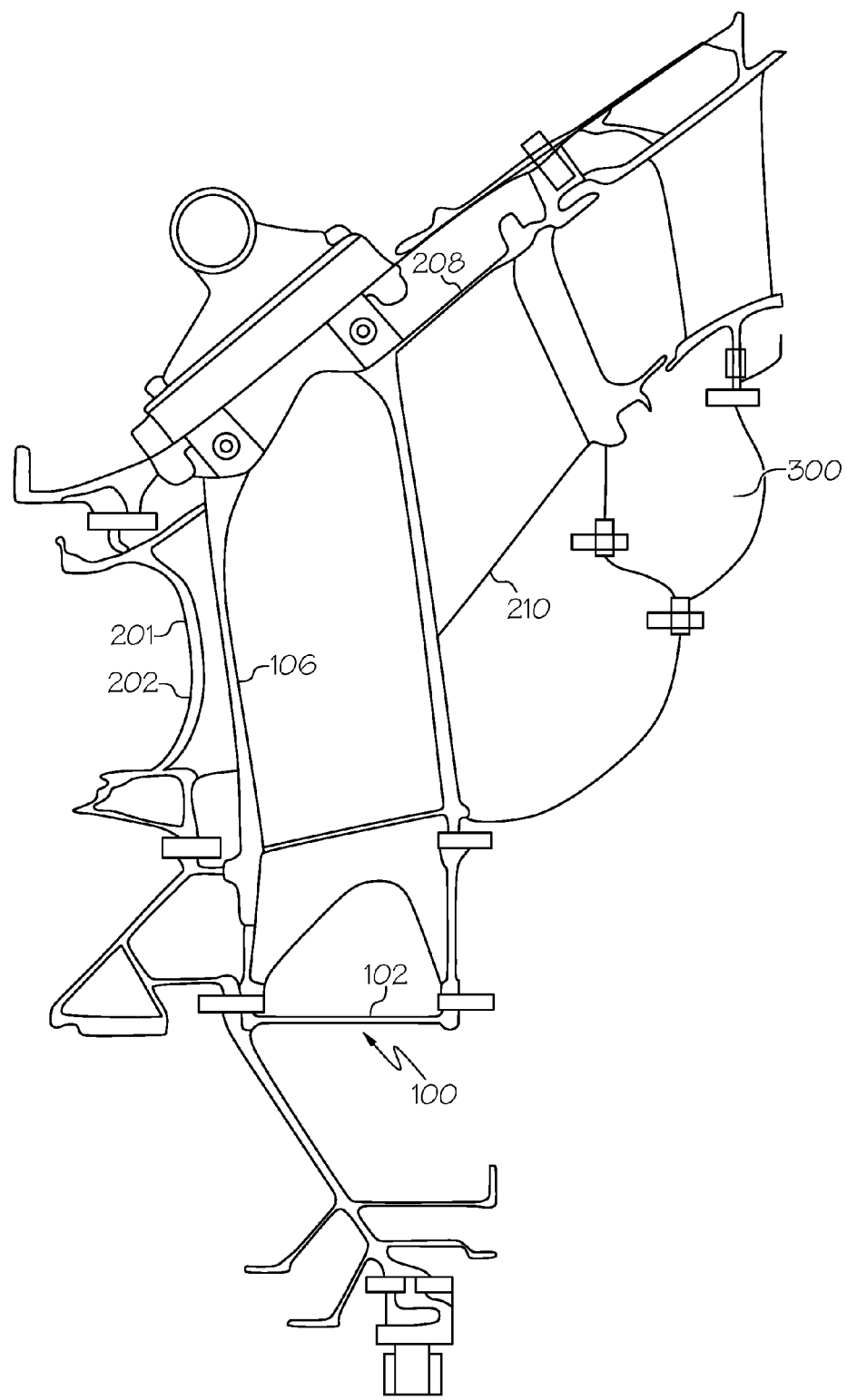
FIG. 4 is a cross-sectional view illustration of an exemplary turbine center frame and transition duct that may be used in the turbine engine illustrated in FIG. 1.

Illustrated in FIGS. 2-4 is an exemplary turbine center frame 100 and the transition duct 300. The transition duct 300 includes an exemplary fairing 200 that may be used with the turbine center frame 100. The turbine center frame 100 in part supports and mechanically and structurally couples the high pressure turbine 24 to the low pressure turbine 26. The turbine center frame 100 includes a central hub 102 and an outer ring 104 positioned about central hub 102 coupled together with struts 106 extending radially therebetween. The fairings 200 are used to protect turbine center frame 100 from a hot gas path environment within the transition duct 300. Each of the struts 106 passes radially through and is protected by a hollow fairing airfoil 201 of the fairing 200. The fairing airfoil 201 includes a leading edge 202 and a trailing edge 206 and a chord C defined therebetween. In the exemplary embodiment, the fairing airfoil 201 has an aerodynamic cross-sectional shape, as further illustrated in FIG. 7, and extends radially between radially outer and inner walls 302, 304 of the fairing 200. Radially outer and inner shrouds 208, 210 define the transition duct 300 and a transition duct flow passage 306 therein containing the fluid flow 280. An assembly of the plurality of fairings 200 are arranged about the central hub 102 of the turbine center frame 100. The substantially annular transition duct 300 is formed by the outer and inner shrouds 208, 210 about the centerline axis 8 (illustrated in FIG. 1).

Figure 5:
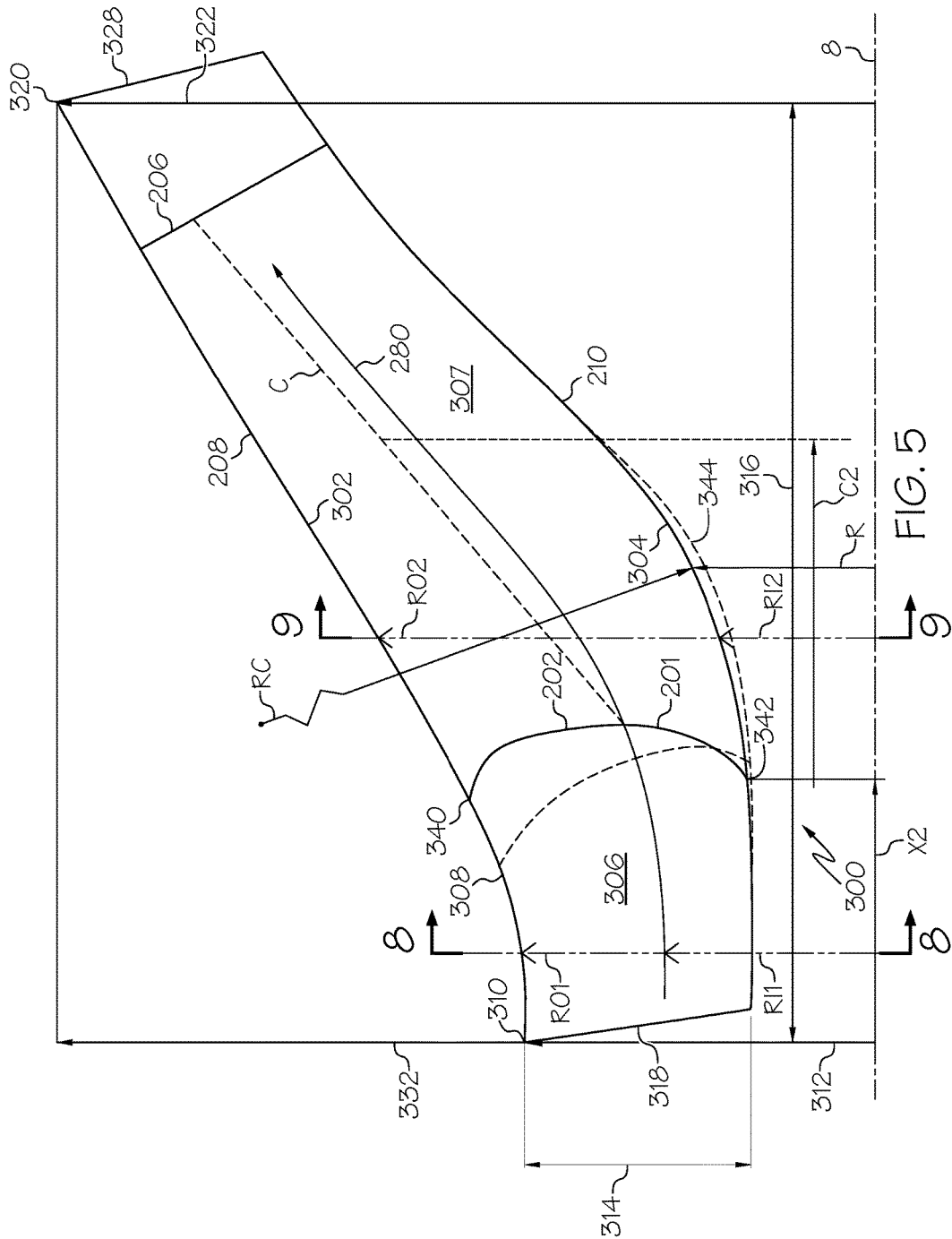
FIG. 5 is a schematic cross-sectional view illustration of the transition duct with the fairing illustrated in FIG. 3.

Illustrated in FIG. 5 is a schematic cross-sectional view of the transition duct 300 formed at least in part by the radially outer shroud 208 and the radially inner shroud 210. The transition duct flow passage 306 is in part defined between the radially outer and inner walls 302, 304. The radially outer and inner walls 302, 304 extend and are contoured from an upstream end 310 of transition duct 300 to a downstream end 320 of transition duct 300 to facilitate coupling HPT in flow communication with LPT (shown in FIG. 1). The transition duct flow passage 306 includes a fairing airfoil passage 307 extending through the transition duct flow passage 306 between the leading and trailing edges 202, 206 of the fairing airfoil 201.

More specifically, the curvature and slope of radially outer wall 302 are controlled to facilitate reducing flow separation within transition duct 300. For example, in the exemplary embodiment, radially outer wall 302 includes an aggressive outer wall slope from upstream end 310 to a predetermined axial location 308, and reduced slope from predetermined axial location 308 to downstream end 320 of the transition duct 300. As used herein, the term "slope" refers to the angle, at any given point, of radially outer wall 302 and radially inner wall 304 with respect to centerline axis 8.

Accordingly, in the exemplary embodiment of the transition duct 300, radially outer wall 302 at upstream end 310 is located at a first radial distance 312 from the centerline axis 8 and radially outer wall 302 at downstream end 320 is located at a second radial distance 322 from the centerline axis 8. The second radial distance 322 is greater than the first radial distance 312 and they define a radius difference (AR) 332 between them. Furthermore, in the exemplary embodiment, transition duct 300 includes a height 314, a length 316, a first area 318 at the upstream end 310, and a second area 328 at the downstream end 320. As such, controlled radially outer wall 302 diffusion is provided when the transition duct 300 has radius ratio (AR 332/height 314) of greater than about 2.0, a length 316/height 314 ratio of between about 2.75 and 4.50, and an area ratio (second area 328/first area 318) of greater than about 1.35.

The radially inner wall 304 may be shaped to reduce losses due to flow distortion caused by low momentum flow or regions exiting the high pressure turbine 24. The low momentum flow from the high pressure turbine 24 mostly occurs along the inner wall 304 of the transition duct 300. It is generally known that the less you disturb the low momentum flow, the less additional loss you generate. In the transition duct 300 the primary way the flow gets disturbed is by static pressure gradients. Decreasing pressure in the downstream direction through the transition duct 300 accelerates the low momentum flow and increasing pressure decelerates the low momentum flow. The inner wall 304 is shaped to smooth out pressure gradients so that the fluid does not get decelerated and re-accelerated. This reduces bouncing of the flow between deceleration and re-acceleration which keeps the losses low. When the pressure gradients are smooth, the fluid does not get decelerated/re-accelerated, and this reduction in bouncing the flow around keeps the losses low.

Figure 10:
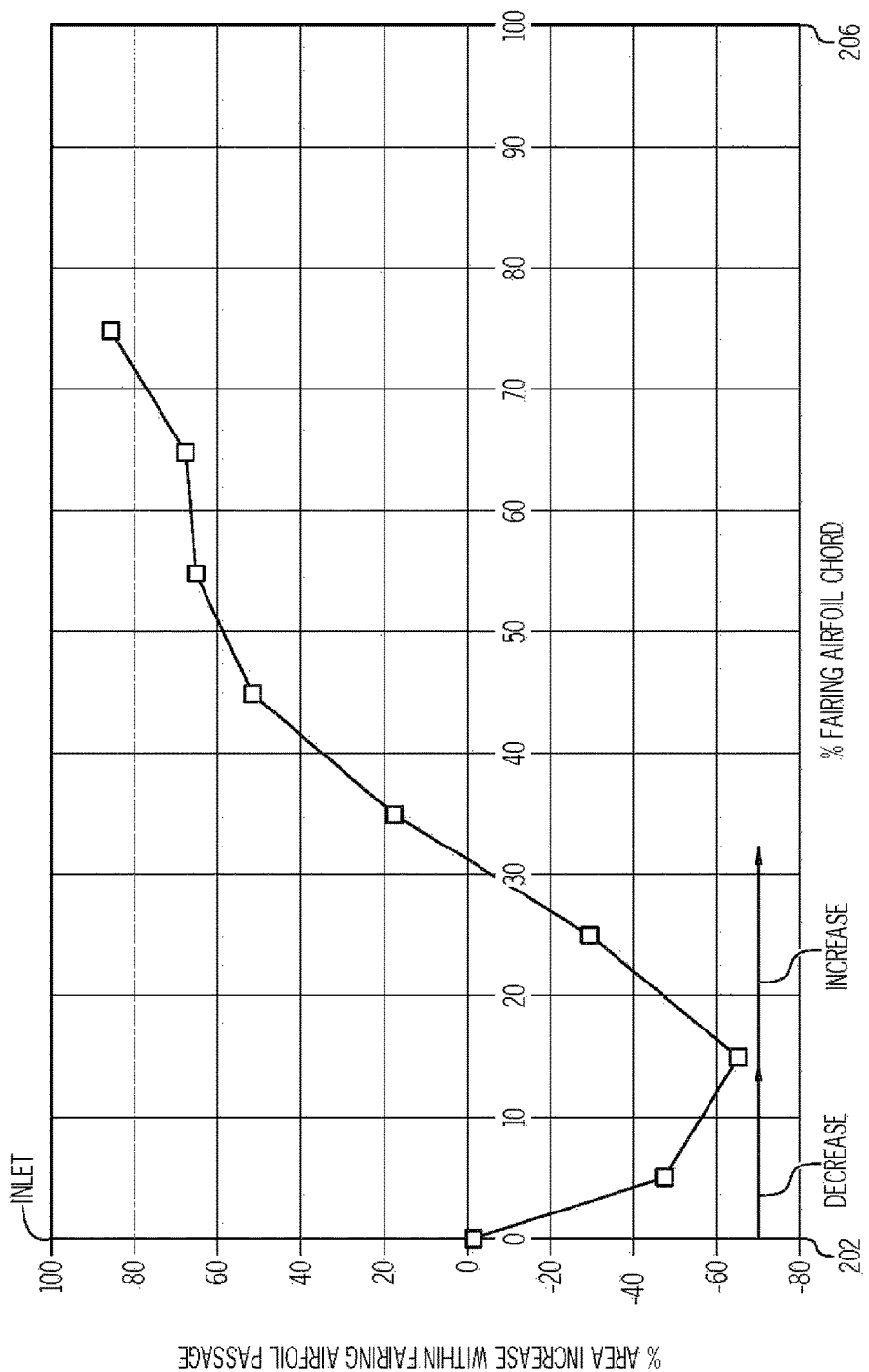
FIG. 10 is a graphical illustration of exemplary pressure gradients along an inner wall of the transition duct illustrated in FIG. 5.

Graphically illustrated in FIG. 10 is one exemplary means for smoothing pressure gradients along the inner wall 304 to reduce these losses. The exemplary means includes a contracting duct flow area A of the fairing airfoil passage 307 from the leading edge 202 of the fairing airfoil 201 to about 30% of the fairing chord C. Note that the fairing airfoil passage 307 extends through the transition duct 300 and the transition duct flow passage 306 between the leading and trailing edges 202, 206 of the fairing airfoil 201. The contraction may be accomplished by increasing the radius R of the inner wall 304 of a predetermined or nominal transition duct design 344 indicated in dashed line format in FIG. 5.

Figure 8:
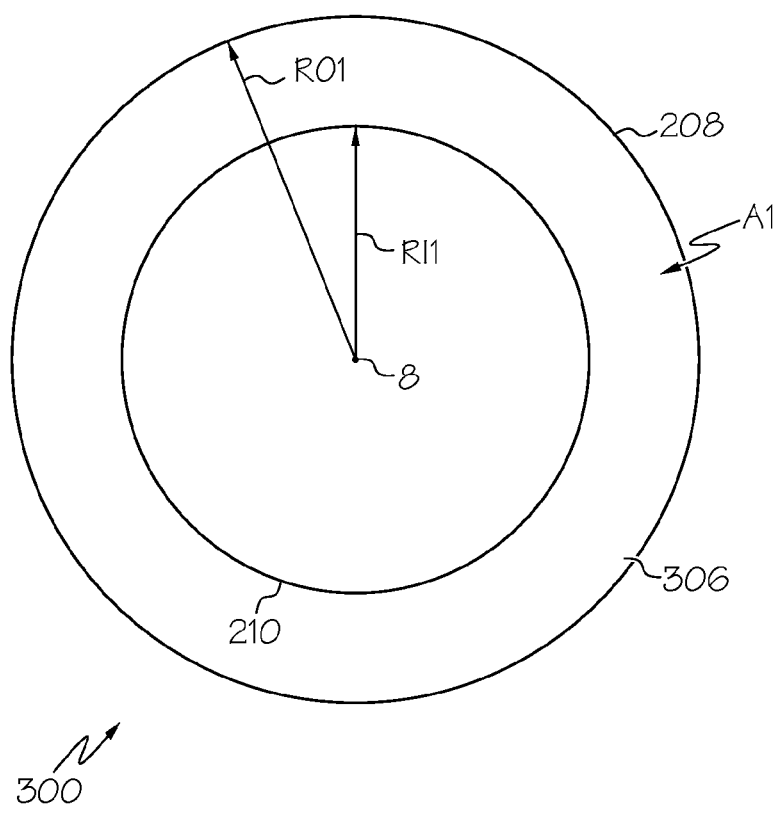
FIG. 8 is a cross-sectional view schematical illustration of a first flow area in a portion of the transition duct without the fairing airfoil through 8-8 in FIG. 5.
Figure 9:
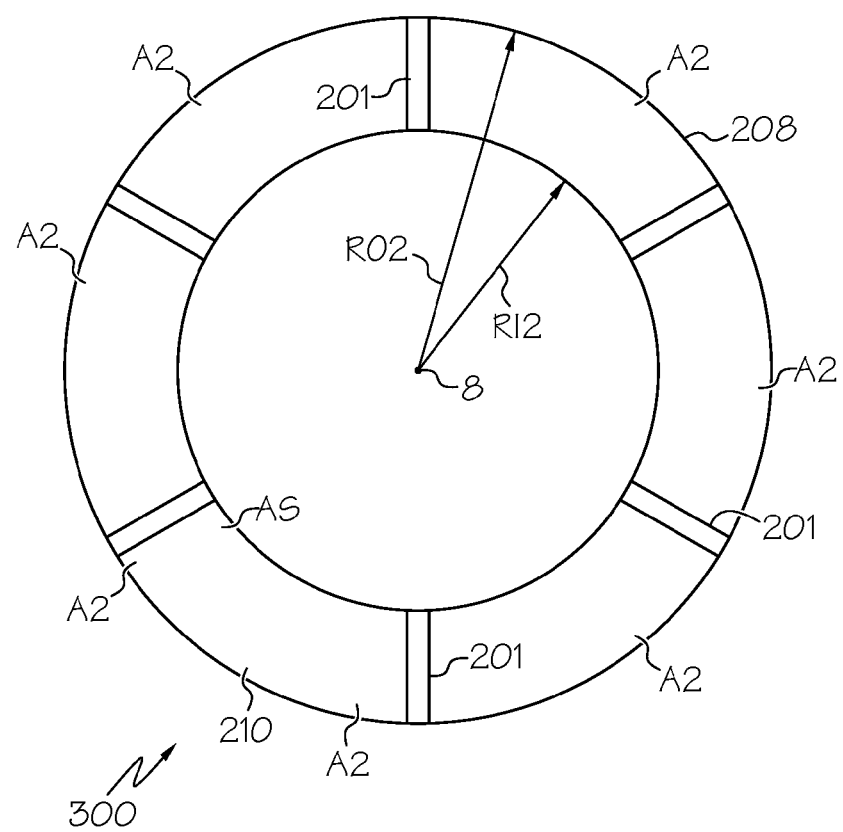
FIG. 9 is a cross-sectional view schematical illustration of a second flow area in a portion of the transition duct with the fairing airfoil through 9-9 in FIG. 5.

The duct area A is illustrated in FIG. 8 as an annular first area A1 between the outer and inner shrouds 208, 210 circumscribed about the centerline axis 8 at first outer and inner radii RO1, RI1 respectively. The duct area A is illustrated in FIG. 9 as a sectored annular second area A2 between the outer and inner shrouds 208, 210 circumscribed about the centerline axis 8 at second outer and inner radii RO2, RI2 respectively and between the fairing airfoils 201. The second area A2 is the sum of area sectors AS. Each of the area sectors AS extend between the outer and inner shrouds 208, 210 and between each pair of the fairing airfoils 201. The second area A2 may first decrease and then increase up through about the first 30% of the fairing airfoil passage 307 in which the fairing airfoil passage 307 has a lower area than at the inlet of the fairing airfoil passage 307 and through which the fluid flow 280 accelerates. A constant curvature of the inner shroud 210 is maintained through the fairing airfoil passage 307 from the leading edge 202 of the fairing airfoil 201 through about 50% of the fairing chord C. This is further indicated by radius of curvature RC in FIGS. 5 and 6. Between about 30% to 50% of the fairing chord C or length of the fairing airfoil passage 307 the duct area A expands as illustrated in FIG. 10.

Illustrated in FIG. 5 is a schematic cross-sectional view of the fairing airfoil 201 in the transition duct 300. The leading edge 202 is swept aftwardly. The exemplary leading edge 202 illustrated in FIG. 5 curves axially aftwardly and radially into the fairing airfoil 201 and the transition duct flow passage 306 between the radially outer and inner walls 302, 304 from radially outer and inner intersection points 340, 342 of the leading edge 202 along the radially outer and inner walls 302, 304 respectively. Exemplary aftwardly swept curved shapes of the leading edge 202 may be elliptical or parabolic or circular.

Sweep is defined relative to incoming stream surfaces of a fluid flowable through the transition duct flow passage 306 over the fairing airfoil 201. Aerodynamic sweep is a conventional parameter represented by the inclination of an airfoil surface, such as the leading edge 202 of the fairing airfoil 201, in the direction of flow relative to the transition duct flow passage 306. A positive sweep angle is indicative of the leading edge 202 inclined in a downstream or aft direction.

Figure 6:
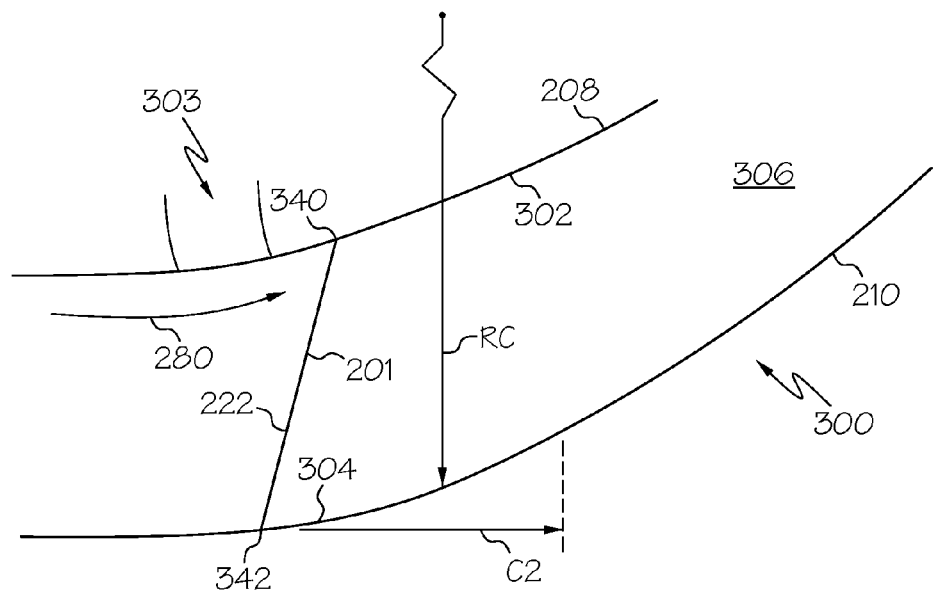
FIG. 6 is a cross sectional view illustration of an alternative aft swept leading edge that may be used with the turbine center frame shown in FIG. 2.

Illustrated in FIG. 6 is a schematic cross-sectional view illustration of another exemplary aft swept and aft or downstream leaning leading edge 222 of the fairing airfoil 201 in the transition duct 300. The downstream leaning leading edge 222 is swept downstream or aftwardly. The exemplary downstream leaning leading edge 222 illustrated in FIG. 6 sweeps or leans axially aftwardly or downstream and radially into the fairing airfoil 201 and the transition duct flow passage 306 from the inner wall 304 from a radially inner intersection point 342 of the downstream leaning leading edge 222 along the radially inner wall 304.

The leading edge 202 of the fairing airfoil 201 illustrated in FIG. 5 attaches or intersects the radially outer wall 302 aft or downstream of a region of high curvature 303 of the radially outer wall 302. The aft swept and aft or downstream leaning leading edge 222 of the fairing airfoil 201 illustrated in FIG. 6 attaches or intersects the radially outer wall 302 aft or downstream of a region of high curvature 303 of the radially outer wall 302. This decreases interaction loss with a blade tip vortex from the HPT and incidence loss.

Figure 7:
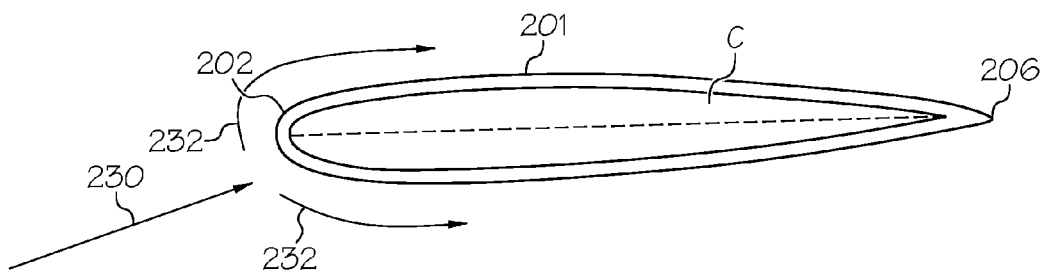
FIG. 7 is a cross-sectional view schematical illustration of a fairing airfoil of the fairing through 7-7 in FIG. 3.

The swept leading edges place the intersection of the outer wall and leading edge in a lower velocity region. The flow exiting the high pressure turbine upstream of the transition duct is not completely axial, it has some tangential swirl components 230 that generate incidence 232 on the leading edge 202 of the fairing airfoil 201 as illustrated in FIG. 7. Curvature of the outer wall causes the primary flow to accelerate then decelerate as it moves around the curvature. Combining the outer wall curvature with the leading edge incidence causes additional flow stress and loss generation. By moving the fairing leading edge aft of the curvature region by using sweep, the two flow regions are disconnected, reducing the flowfield stress and losses. The swirling flow is generated in the HPT by inefficiencies in the blading near the outer wall where there is a gap to allow the blades to rotate and flow leaks over the top.

Sweeping the LE aft also re-aligns the static pressure gradients. The thickening of the LE increases the static pressure locally, and any low momentum flow exiting the HPT is affected by this. Conventionally located leading edges near the inner wall generate an increase in pressure that is directly in line with the low static pressure caused by the flow moving around the outer wall curvature. This pressure gradient is normal to the flow exiting the HPT and has a maximum effect on the low momentum fluid flow, thus, increasing the losses in the duct. By sweeping the leading edge aft, the static pressure gradient becomes disconnected with the outer wall curvature reducing the effect on the low momentum fluid because flow now at an angle to the flow.

While there have been described herein what are considered to be preferred and exemplary embodiments of the present invention, other modifications of the invention shall be apparent to those skilled in the art from the teachings herein and, it is, therefore, desired to be secured in the appended claims all such modifications as fall within the true spirit and scope of the invention.

Accordingly, what is desired to be secured by Letters Patent of the United States is the invention as defined and differentiated in the following claims:

The invention claimed is:

1. A gas turbine engine transition duct comprising:
a plurality of fairings including hollow fairing airfoils extending radially between radially outer and inner walls of the plurality of fairings,
a transition duct flow passage radially disposed at least in part between the radially outer and inner walls,
the hollow fairing airfoils extending aft or downstream along a fairing chord, and
a means for smoothing pressure gradients along the radially inner wall.

2. The gas turbine engine transition duct in accordance with claim 1 further comprising a fairing airfoil passage extending through the gas turbine engine transition duct between leading and trailing edges of the hollow fairing airfoil and the means for smoothing pressure gradients including a contracting duct flow area of the fairing airfoil passage from the leading edge of the hollow fairing airfoil to about 30% of the fairing chord.

3. The gas turbine engine transition duct in accordance with claim 1 further comprising leading edges of each of the hollow fairing airfoils attached to or intersecting the radially outer wall aft or downstream of regions of curvature of the radially outer wall.

4. The gas turbine engine transition duct in accordance with claim 3 further comprising the leading edges aftwardly sweeping or aftwardly leaning downstream.

5. The gas turbine engine transition duct in accordance with claim 4 further comprising radially outer and inner intersection points of the leading edges along the radially outer and inner walls respectively and the radially outer intersection points located aft and downstream of the radially inner intersection points.

6. The gas turbine engine transition duct in accordance with claim 3 further comprising the leading edges curving axially aftwardly and radially into the transition duct flow passage from radially outer and inner intersection points of the leading edges along the radially outer and inner walls respectively.

7. The gas turbine engine transition duct in accordance with claim 6 further comprising the radially outer intersection points located aft and downstream of the radially inner intersection points.

8. The gas turbine engine transition duct in accordance with claim 3 further comprising:
the gas turbine engine transition duct circumscribed about a centerline axis;
a first radial distance extending radially from the centerline axis to the radially outer walls at an upstream end of the duct;
a second radial distance extending radially from the centerline axis to the radially outer walls at a downstream end of the duct;
the second radial distance greater than the first radial distance;
the transition duct including a height, a length, a first area at the upstream end, and a second area at the downstream end;
an area ratio defined as (the second area/the first area); and
the means for smoothing pressure gradients including the area ratio.

9. The gas turbine engine transition duct in accordance with claim 8 further comprising the leading edges aftwardly sweeping or aftwardly leaning downstream.

10. The gas turbine engine transition duct in accordance with claim 8 further comprising radially outer and inner intersection points of the leading edge along the radially outer and inner walls respectively and the radially outer intersection points located aft and downstream of the radially inner intersection points.

11. The gas turbine engine transition duct in accordance with claim 8 further comprising the leading edges curving axially aftwardly and radially into the transition duct flow passage from radially outer and inner intersection points of the leading edges along the radially outer and inner walls respectively.

12. The gas turbine engine transition duct in accordance with claim 11 further comprising the radially outer intersection points located aft and downstream of the radially inner intersection points.

13. A gas turbine engine transition duct and turbine center frame assembly comprising:
a turbine center frame including an outer ring positioned about a central hub coupled together with struts extending radially therebetween,
a transition duct including a plurality of fairings including hollow fairing airfoils extending radially between radially outer and inner walls of the plurality of fairings,
the struts passing radially through the hollow fairing airfoils,
a transition duct flow passage of the gas turbine engine transition duct radially disposed at least in part between the radially outer and inner walls,
the hollow fairing airfoils extending aft or downstream along a fairing chord, and
means for smoothing pressure gradients along the radially inner wall.

14. The gas turbine engine transition duct and turbine center frame assembly in accordance with claim 13 further comprising a fairing airfoil passage extending through the transition duct between leading and trailing edges of the hollow fairing airfoils and the means for smoothing pressure gradients including a contracting duct flow area of the fairing airfoil passage from the leading edge of the hollow fairing airfoil to about 30% of the fairing chord.

15. The gas turbine engine transition duct and turbine center frame assembly in accordance with claim 14 further comprising leading edges of the fairing airfoils attached to or intersecting the radially outer walls aft or downstream of regions of curvature of the radially outer walls.

16. The gas turbine engine transition duct and turbine center frame assembly in accordance with claim 15 further comprising the leading edges aftwardly sweeping or aftwardly leaning downstream.

17. The gas turbine engine transition duct and turbine center frame assembly in accordance with claim 16 further comprising radially outer and inner intersection points of the leading edges along the radially outer and inner walls respectively and the radially outer intersection points located aft and downstream of the radially inner intersection points.

18. The gas turbine engine transition duct and turbine center frame assembly in accordance with claim 15 further comprising the leading edges curving axially aftwardly and radially into the hollow fairing airfoils and the transition duct flow passage between the radially outer and inner walls from radially outer and inner intersection points of the leading edges along the radially outer and inner walls respectively.

19. The gas turbine engine transition duct and turbine center frame assembly in accordance with claim 18 further comprising the radially outer intersection points located aft and downstream of the radially inner intersection points.

20. A gas turbine engine comprising:
the gas turbine engine circumscribed about a centerline axis and including in downstream serial relationship a fan, a low pressure booster or compressor, a high pressure compressor, a combustor, a high pressure turbine, and a low pressure turbine;
a turbine center frame in part supporting and coupling together the high and low pressure turbines;
the turbine center frame including an outer ring positioned about a central hub coupled together with struts extending radially therebetween;
a transition duct fluidly connecting the high and low pressure turbines and including a plurality of fairings including hollow fairing airfoils extending radially between radially outer and inner walls of the plurality of fairings;
the struts passing radially through the hollow fairing airfoils;
a transition duct flow passage of the transition duct radially disposed at least in part between the radially outer and inner walls;
the hollow fairing airfoils extending aft or downstream along a fairing chord;
a fairing airfoil passage extending through the transition duct between leading and trailing edges of the hollow fairing airfoils;
a means for smoothing pressure gradients along the radially inner wall including a contracting duct flow area of the fairing airfoil passage from the leading edge of the hollow fairing airfoils to about 30% of the fairing chord; and
leading edges of the fairing airfoils attached to or intersecting the radially outer walls aft or downstream of regions of curvature of the radially outer walls.

21. The gas turbine engine in accordance with claim 20 further comprising:
a first radial distance extending radially from the centerline axis to the radially outer walls at an upstream end of the transition duct;
a second radial distance extending radially from the centerline axis to the radially outer walls at a downstream end of the transition duct;
the second radial distance greater than the first radial distance;
the transition duct including a height, a length, a first area at the upstream end, and a second area at the downstream end;
an area ratio defined as (the second area/the first area); and
the means for smoothing pressure gradients including the area ratio.

22. The gas turbine engine in accordance with claim 20 further comprising the leading edges aftwardly sweeping or aftwardly leaning downstream.

23. The gas turbine engine in accordance with claim 20 further comprising radially outer and inner intersection points of the leading edges along the radially outer and inner walls respectively and the radially outer intersection points located aft and downstream of the radially inner intersection points.

24. The gas turbine engine in accordance with claim 20 further comprising the leading edges curving axially aftwardly and radially into the hollow fairing airfoils and the transition duct flow passage between the radially outer and inner walls from radially outer and inner intersection points of the leading edges along the radially outer and inner walls respectively.

25. The gas turbine engine in accordance with claim 24 further comprising the radially outer intersection points located aft and downstream of the radially inner intersection points.

* * * * *